(12) United States Patent
Pfeiffer et al.

(10) Patent No.: US 9,149,061 B2
(45) Date of Patent: Oct. 6, 2015

(54) SALT REPLACEMENT MIXTURE WITH REDUCED NACl CONTENT

(75) Inventors: Matthias Pfeiffer, Boehl-Iggelheim (DE); Claudia Scholten, Mannheim (DE); Sabine Oellers, Hockenheim (DE)

(73) Assignee: JUNGBUNZLAUER LADENBURG GMBH, Ladenburg (DE)

( * ) Notice: Subject to any disclaimer, the term of this patent is extended or adjusted under 35 U.S.C. 154(b) by 1721 days.

(21) Appl. No.: 12/296,706

(22) PCT Filed: Mar. 17, 2007

(86) PCT No.: PCT/EP2007/002363
§ 371 (c)(1),
(2), (4) Date: Mar. 5, 2009

(87) PCT Pub. No.: WO2007/118566
PCT Pub. Date: Oct. 25, 2007

(65) Prior Publication Data
US 2009/0169701 A1 Jul. 2, 2009

(30) Foreign Application Priority Data
Apr. 11, 2006 (DE) .................. 10 2006 017 378

(51) Int. Cl.
| A23L 1/237 | (2006.01) |
| A23L 1/39 | (2006.01) |
| A21D 2/14 | (2006.01) |
| A21D 2/36 | (2006.01) |
| A21D 2/02 | (2006.01) |

(52) U.S. Cl.
CPC . *A23L 1/237* (2013.01); *A21D 2/02* (2013.01); *A21D 2/145* (2013.01); *A23L 1/39* (2013.01)

(58) Field of Classification Search
CPC .......... A21D 2/02; A21D 2/145; A23L 1/237; A23L 1/39
USPC .................. 426/649, 580, 641, 619, 589, 806
See application file for complete search history.

(56) References Cited

U.S. PATENT DOCUMENTS

| 3,514,296 A | 5/1970 | Frank et al. |
| 4,068,006 A | 1/1978 | Moritz |
| 4,382,098 A | 5/1983 | Bolin et al. |
| 4,473,595 A | 9/1984 | Rood et al. |
| 5,562,942 A | 10/1996 | Koh et al. |
| 5,605,697 A * | 2/1997 | Asano et al. .................. 424/439 |
| 6,013,298 A | 1/2000 | Takano et al. |
| 6,242,040 B1 | 6/2001 | Kakiuchi et al. |
| 6,743,461 B1 | 6/2004 | Vasquez |

FOREIGN PATENT DOCUMENTS

| DE | 31 44 166 A1 | 6/1982 |
| EP | 0 417 062 B1 | 3/1991 |
| EP | 0 796 558 B1 | 9/1997 |
| EP | 0 919 137 B1 | 6/1999 |
| GB | 2 396 793 A | 7/2004 |
| JP | 2-265456 A | 10/1990 |
| JP | 10-56997 A | 3/1998 |
| JP | 10-57003 A | 3/1998 |
| WO | WO 96/17521 A1 | 6/1996 |

* cited by examiner

Primary Examiner — Michele L Jacobson
Assistant Examiner — Saeeda Latham
(74) Attorney, Agent, or Firm — Paul D. Strain, Esq.; Strain & Strain PLLC

(57) ABSTRACT

The invention relates to a salt substitute mixture containing NaCl, KCl and sodium gluconate. The ratio by weight of KCl to sodium gluconate ranges from 1.5:1 to 1:1.5 and the proportion of NaCl is at least 45% by weight. Furthermore, the invention relates to the use of the mixture in the food industry and as a spice mixture.

17 Claims, No Drawings

SALT REPLACEMENT MIXTURE WITH REDUCED NACI CONTENT

CROSS-REFERENCE TO RELATED PATENT APPLICATIONS

This application is a National Stage of International Application No. PCT/EP2007/002363, filed Mar. 17, 2007, which is based upon and claims the benefit of priority from prior German Patent Application No. 10 2006 017 378.3, filed Apr. 11, 2006, the entire contents of all of which are incorporated herein by reference in their entirety.

STATEMENT REGARDING FEDERALLY SPONSORED RESEARCH OR DEVELOPMENT is not applicable to this application.

THE NAMES OF THE PARTIES TO A JOINT RESEARCH AGREEMENT is not applicable to this application.

INCORPORATION-BY-REFERENCE OF MATERIAL SUBMITTED ON A COMPACT DISC is not applicable to this application.

BACKGROUND

The present invention relates to mixtures, which are suitable as a salt substitute and for reducing the sodium chloride content in foods, and to their use.

A harmful effect on health has been ascribed to sodium chloride for many years. In particular, the blood pressure is said to increase by the uptake of sodium chloride. Admittedly, an elevated blood pressure also represents an increased risk, as for instance, for heart and circulation diseases. Although the effect of sodium chloride on blood pressure is not undisputed, attempts have been made for some time to reduce the sodium chloride content especially of ready-to-serve meals and other industrially manufactured foods. In so doing, the taste should not suffer and, in some foods, such as white bread, the functional effects of the sodium chloride cannot be omitted.

Aside from a replacement of the sodium chloride by classical spices, which do without retaining the salty taste, especially salt substitute mixtures are in use, for which sodium is replaced by potassium, calcium and/or magnesium. The taste has to be adjusted to that of sodium chloride by additives, such as organic acids for example adipic, citric or glutamic acid. Reference is made to the following publications by way of example.

A mixture of NaCl and KCl in the ratio of 80:20 to 20:80 is described in U.S. Pat. No. 3,514,296 as a salt substitute.

U.S. Pat. No. 4,068,006 proposes mixtures of NaCl, KCl and citric acid. According to EP 417 062, a mixture of NaCl, KCl and monomagnesium citrate-5-hydrate is used. According to U.S. Pat. No. 5,562,942, 100 parts of a mixture of 30 to 75% NaCl and 25 to 70% KCl with 5 to 60 parts of citrate is to be used.

JP 10056997 proposes the use of alkali metal gluconates as a salt substitute; the JP 10057003 and the WO 96/17521 describe mixtures of alkali metal gluconates and table salt.

Mixtures of NaCl, KCl and magnesium salts are proposed in U.S. Pat. No. 4,473,595 and GB 2396793.

U.S. Pat. No. 6,743,461 is referred to as an example of the use of spices and proposes a mixture of calcium chloride with a potassium salt, citric acid, rice flour, ginger oil and aromas.

Generally, the taste of salt substitute mixtures without sodium chloride is unsatisfactory, so that most mixtures contain at least a portion of common salt. However, even such mixtures produce either a distinct off flavor or an inadequate salt taste, especially when the amount is intended not to differ clearly from the comparable amount of common salt.

Accordingly, the problem of finding compositions, which taste sufficiently salty, do not have an off flavor and, at the same time, permit the NaCl content to be reduced, continues to exist.

Surprisingly, it has now been found that, with mixtures of NaCl, KCl and sodium gluconate, for which the ratio by weight of KCl to gluconate ranges from 1.5:1 to 1:1.5 and which contain at least 45% NaCl, the above problem is solved.

U.S. Pat. No. 6,242,040 indeed already proposes compositions of 40 to 400 parts of sodium gluconate with 100 parts of a mixture of 40 to 60% NaCl and 60 to 40% KCl. However, most of these compositions when used in the same amount as common salt, are either not sufficiently salty or have a distinct off flavor.

A balanced proportion between a salty taste and an absence of off flavor can be attained only with the ratio of gluconate to KCl limited according to the invention. The proportion of NaCl ensures that the amounts, added to a food, or, when used as such, the amount used corresponds approximately to that of common salt.

SUMMARY OF THE INVENTION

The invention therefore relates to a salt substitute mixture containing NaCl, KCl and sodium gluconate, the ratio by weight of KCl to sodium gluconate ranging from 1.5:1 to 1:1.5 and the proportion of NaCl being at least 45% by weight.

The ratio by weight of gluconate to potassium chloride preferably ranges from 1.3:1 to 1:1.3, particularly from 1.1:1 to 1:1.1 and especially 1:1.

For a sufficiently salty taste, the proportion of sodium chloride should be 45 to 65% by weight and preferably 50% by weight to 60% by weight. Admittedly, higher proportions of common salt would be usable from a taste point of view; however, the object of reducing the NaCl content would no longer be fulfilled satisfactorily if the NaCl content exceeded 65% by weight.

It is a particular advantage of the inventive mixtures that to achieve a salty taste comparable to that of common salt in about the same amounts of the salt substitute mixture can be used, that is, not more than about 30% and preferably less than 20% more. In particular, this facilitates the use as a substitute for common salt in the individual preparation of foods. However, it is advantageous also in the food industry if the ingredients, such as salt or a salt substitute, are not contained in high amounts. This increases acceptance by consumers.

In a preferred embodiment, up to 5% by weight and preferably up to 3% by weight of glucono-delta-lactone may be added to the inventive mixtures. The salty taste is intensified by these means. In addition, the pH is lowered by glucono-delta-lactone and this results in an improved microbial stability.

The inventive mixtures can be used advantageously for the production of foods, in order to reduce the proportion of sodium in the product without, at the same time, decreasing the salty taste. The main areas of use are finished and semi-finished products (such as soups, sauces), in the production of baked goods (such as bread), in meat products, dairy products (such as cheese) and in the area of breakfast cereals. The taste (sensory) aspect is very important here. Foods, in which the sodium content is reduced, frequently lose their typical taste and are regarded as tasteless by the consumer. A bitter character also frequently arises due to the use of other salts. None of these effects occur when an inventive salt substitute mixture is used.

Furthermore, the inventive mixtures are suitable as a replacement for common salt and for use in spice mixtures.

The mixtures may be obtained by mixing the components.

TABLE 1

| KCl | NaG | KCl/NaG | Sensory Description |
|---|---|---|---|
| 20 | 20 | 1:1 | Salty, typical common salt taste |
| 15 | 25 | 1:1.7 | Salty, but not particularly like common salt, slight off flavor |
| 10 | 30 | 1:3 | Salty with atypical off flavor |
| 5 | 35 | 1:7 | Salty, but not typical of common salt, off flavor |
| 35 | 5 | 7:1 | Clearly bitter character, hardly recognizable as salty |
| 30 | 10 | 3:1 | Bitter, hardly salty |
| 25 | 15 | 1.7:1 | Less salty than standard, slight bitter character |

A higher proportion of KCl quickly gives a bitter taste to the mixture. Admittedly, an increased proportion of sodium gluconate gives the mixture a salty taste; however, it has a special salty character, which is not identical with that of common salt and is therefore recognized as an off flavor.

EXAMPLE 2

Various salt substitute mixtures in a tomato soup were compared with a soup having a regular salt content (7% NaCl). The mixtures tested and the evaluations are listed in Table 2.

TABLE 2

| NaCl | KCl | NaG | Percentage | pH | Evaluation | Sensory Description |
|---|---|---|---|---|---|---|
| 100 | 0 | 0 | 7% | 4.54 |  | Balanced taste, good salt taste, fruity |
| 0 | 50 | 50 | 39% | 4.94 | − | Very salty with a distinctly bitter "KCl taste" |
| 8 | 46 | 46 | 26% | 4.85 | − | Bitter, hardly salty. |
| 20 | 40 | 40 | 17% | 4.68 | −/+ | Salty with bitter character |
| 31 | 34.5 | 34.5 | 13% |  | ++ | Salty, good taste |
| 60 | 20 | 20 | 8% | 4.42 | ++ | Salty, very good taste, the acidic character is retained fully |

The invention is to be described in greater detail by means of the following examples without, however, being limited to these. Unless stated otherwise, all parts or percentages are by weight.

EXAMPLE 1

Mixtures with, in each case, 60% NaCl and varying ratios of KCl: sodium gluconate were used to investigate the effect of different KCl: sodium gluconate ratios. Sodium gluconate is abbreviated as NaG. Solutions with 6 g/liter in distilled water were prepared for the tasting. These solutions were tasted in comparison to the inventive mixture of 20% NaG, 20% KCl and 60% NaCl. The results are summarized in Table 1.

The tasting shows that a pleasant taste is achieved only if sufficient amounts of NaCl are present. Nevertheless, with an amount of salt substitute mixture, which is only 15% higher, a clear reduction in the sodium chloride content of 25% is possible. Admittedly, a good taste is achieved with the mixture containing 31% NaCl; however, in order to achieve a taste comparable to that of NaCl, nearly twice as much of this mixture is required.

EXAMPLE 3

The effect of adding glucono-delta-lactone (abbreviated GdL) was investigated. Mixtures given in Table 3 were prepared for this purpose and, as in Example 2, tasted in a tomato soup in comparison to common salt. The results are summarized in Table 3.

TABLE 3

| NaCl | KCl | NaG | GdL | Percent. | pH | Evaluation | Sensory Description |
|---|---|---|---|---|---|---|---|
| 100 | 0 | 0 | 0 | 7% | 4.54 | | Balanced taste, good salt taste, fruity |
| 0 | 48.5 | 48.5 | 3 | 40% | 4.76 | – | Bitter, not salty |
| 8 | 44.5 | 44.5 | 3 | 26% | 4.71 | – | slightly salty, distinctly bitter character, more salty than standard |
| 20 | 38.5 | 38.5 | 3 | 17% | 4.67 | –/+ | too salty, more salty than standard |
| 31 | 33 | 33 | 3 | 13.2% | 4.40 | ++ | slightly salty, comparable with standard |
| 60 | 18.5 | 18.5 | 3 | 8% | 4.32 | + | salty |

It can be seen that the addition of glucono-delta-lactone increases the salty taste. Nevertheless, it is not possible to eliminate more than 55% of NaCl. In spite of the mixtures with 8% NaCl and 20% NaCl, which are regarded as salty or even clearly more salty than pure common salt, the taste of these mixtures is not evaluated altogether positively. For the mixture with 31% NaCl, a good taste is obtained once again; however, the amount required is nearly twice the amount of NaCl required.

EXAMPLE 4

The functional behavior of the inventive salt substitute mixture was tested in a standard white bread formulation. Because of its neutral taste and the high gluten content, white bread reacts particularly sensitively functionally as well as with regard to its taste, to the NaCl content. For comparison, 20 g NaCl per 1000 g of flour were replaced in a formulation by 23 g of an inventive mixture of 60% NaCl, 20% KCl and 20% sodium gluconate. A reduction in the sodium content of 25% is achieved here. Tasting by a panel of 15 professional tasters revealed that the taste as well as the nature of the bread were not affected negatively by the exchange.

The preparation of the dough and the processing (baking) did not differ from those of the standard formulation. Accordingly, it was possible to show that the inventive mixtures can be regarded as an equivalent replacement of NaCl not only with regard to taste, but also, especially, during the processing. This is accomplished only if, on the one hand, the ratio of potassium chloride to sodium gluconate is maintained and, on the other hand, a sufficient sodium chloride content is present.

BRIEF DESCRIPTION OF THE SEVERAL VIEWS OF THE DRAWING(S)

is not applicable to this application.

The invention claimed is:

1. A salt substitute mixture comprising sodium chloride, potassium chloride, and sodium gluconate, wherein the ratio by weight of potassium chloride to sodium gluconate is 1.5:1 to 1:1.5 and that comprises 50 to 65% by weight of sodium chloride.

2. The salt substitute mixture according to claim 1, wherein the mixture comprises 50 to 60% by weight of sodium chloride.

3. The salt substitute mixture according to claim 2, wherein the ratio of potassium chloride to sodium gluconate is 1.1:1 to 1:1.1.

4. The salt substitute mixture according to claim 3, wherein the mixture further comprises glucono-delta-lactone.

5. The salt substitute according to claim 4, wherein the glucono-delta-lactone is present in the mixture in the amount up to 5% by weight.

6. The salt substitute according to claim 4, wherein the glucono-delta-lactone is present in the mixture in the amount up to 3% by weight.

7. The salt substitute mixture according to claim 2, wherein the mixture further comprises glucono-delta-lactone.

8. The salt substitute according to claim 7, wherein the glucono-delta-lactone is present in the mixture in the amount up to 5% by weight.

9. The salt substitute according to claim 7, wherein the glucono-delta-lactone is present in the mixture in the amount up to 3% by weight.

10. The salt substitute mixture according to claim 1, wherein the ratio of potassium chloride to sodium gluconate is 1.3:1 to 1:1.3.

11. The salt substitute mixture according to claim 1, wherein the mixture further comprises glucono-delta-lactone.

12. The salt substitute according to claim 11, wherein the glucono-delta-lactone is present in the mixture in the amount up to 5% by weight.

13. The salt substitute according to claim 11, wherein the glucono-delta-lactone is present in the mixture in the amount up to 3% by weight.

14. A method of reducing the proportion of sodium in foods, comprising:
substituting a salt substitute mixture comprising sodium chloride, potassium chloride and sodium gluconate, having a ratio by weight of potassium chloride to sodium gluconate from 1.5:1 to 1:1.5 and comprising 50 to 65% by weight of sodium chloride for common salt in the production of finished and semi-finished products in the food industry or in spice mixtures.

15. The method according to claim 14, wherein the product is selected from the group consisting of soups, sauces, baked goods, meat products, dairy products and breakfast cereals.

16. The method according to claim 14, comprising providing the mixture without further additives as a salt substitute or with the addition of further components selected from the group consisting of herbs and aromas as a spice mixture.

17. The method according to claim 14, wherein the salt substitute mixture further comprises glucono-delta-lactone.

* * * * *